(12) United States Patent
Moriguchi et al.

(10) Patent No.: US 6,399,709 B1
(45) Date of Patent: Jun. 4, 2002

(54) PROCESS FOR PRODUCING THERMOPLASTIC ELASTOMER COMPOSITION AND THERMOPLASTIC ELASTOMER COMPOSITION

(75) Inventors: Tsuyoshi Moriguchi, Sodegaura; Hironobu Shigematsu, Ichihara; Noboru Komine, Chiba, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/506,338

(22) Filed: Feb. 18, 2000

(30) Foreign Application Priority Data

Feb. 23, 1999 (JP) ............................................ 11-044824

(51) Int. Cl.$^7$ ..................... C08L 23/00; C08L 23/04; C08L 27/12; C08L 25/02
(52) U.S. Cl. ..................... 525/199; 525/232; 525/240; 525/241
(58) Field of Search ................................ 525/197, 199, 525/232, 240, 241

(56) References Cited

U.S. PATENT DOCUMENTS

| 4,454,092 A | 6/1984 | Shimizu et al. ............. 264/349 |
| 5,298,211 A | 3/1994 | Hamanaka et al. ......... 264/211 |
| 5,847,052 A | 12/1998 | Hamanaka et al. ......... 525/197 |
| 6,037,418 A | * 3/2000 | Mukai et al. ................ 525/242 |

FOREIGN PATENT DOCUMENTS

| EP | 0 311 451 A2 | 4/1989 |
| EP | 0 547 843 A1 | 6/1993 |
| EP | 0 837 098 A1 | 4/1998 |
| GB | 2270915 A | 3/1994 |
| JP | 5825340 A | 2/1983 |
| JP | 58152023 A | 9/1983 |
| WO | 9100890 A1 | 1/1991 |

* cited by examiner

Primary Examiner—Nathan M. Nutter
(74) Attorney, Agent, or Firm—Birch, Stewart, Kolasch & Birch, LLP (57) ABSTRACT

There are provided:

(i) a process for producing a thermoplastic elastomer composition, which comprises the step of feeding rubber and a thermoplastic resin through feed throats independent of one another, respectively, to an extruder to perform melt kneading thereof, wherein the feed throats are connected to the extruder; and (ii) a thermoplastic elastomer composition having a haze value of a glass plate of not higher than about 2%, provided that the haze value is measured with use of an apparatus according to regulations prescribed in ISO 6452 after a lapse of heating time of 20 hours at a heating temperature of 100° C.

9 Claims, 3 Drawing Sheets

PROCESS FOR PRODUCING THERMOPLASTIC ELASTOMER COMPOSITION AND THERMOPLASTIC ELASTOMER COMPOSITION

FIELD OF THE INVENTION

The present invention relates to a process for producing a thermoplastic elastomer composition by melt kneading rubber and a thermoplastic resin with an extruder, and to a thermoplastic elastomer composition.

BACKGROUND OF THE INVENTION

A thermoplastic elastomer composition has found wide use in various fields such as car parts, electric appliance parts and miscellaneous goods, because (i) no vulcanization process is needed, and (ii) a conventional molding machine for a thermoplastic resin is usable when molding the thermoplastic elastomer composition.

As the thermoplastic elastomer composition, an olefinic thermoplastic elastomer composition and a styrenic thermoplastic elastomer composition are known. As the former composition, there are generally known (i) a non-cross-linked composition obtained by melt kneading an olefin copolymer rubber and an olefin polymer resin, and (ii) a cross-linked composition obtained by melt kneading an olefin copolymer rubber and an olefin polymer resin in the presence of a cross-linking agent such as an organic peroxide to perform dynamic cross-linking. As the latter composition, there are known compositions such as (i) a composition comprising a styrene-butadiene block copolymer and an olefin polymer resin, (ii) a composition comprising a styrene-isoprene block copolymer and an olefin polymer resin, and (iii) a composition comprising a hydrogenation product of said block copolymer and an olefin polymer resin.

As a process for producing a non-cross-linked thermoplastic elastomer composition, there is known a process wherein rubber and a thermoplastic resin are kneaded with a closed-type kneading machine such as a Banbury mixer and a kneader. However, said production process is not an efficient one, because the production process uses a batchwise kneading machine of low productivity such as a Banbury mixer and a kneader.

As a process for producing a cross-linked thermoplastic elastomer composition, there is known a process wherein rubber and a thermoplastic resin are kneaded in advance with a closed-type kneading machine such as a Banbury mixer and kneader; the resulting kneaded product is successively granulated to obtain pellets; and then the pellets and a cross-linking agent are melt kneaded in an extruder to perform dynamic cross-linking. However, said production process has problems such that (1) the process needs a step of kneading rubber and a thermoplastic resin prior to said dynamic cross-linking steps, and (2) the process is a complicated and inefficient one, because the process uses a batchwise kneading machine of low productivity such as a Banbury mixer and a kneader.

JP-A 58-25340 and JP-A 58-152023 disclose a process, wherein a mixture of an olefin copolymer rubber in a particle form with an olefin polymer resin in a pellet form is fed through a hopper to an extruder to perform melt kneading of said olefin copolymer rubber and said olefin polymer resin and then perform dynamic cross-linking. However, because the olefin copolymer rubber in a particle form is tacky, rubber having a size similar to that of a pellet can hardly be obtained; as a result, a size of the olefin copolymer rubber in a particle form becomes larger than that of the olefin polymer resin in a pellet form, so that the mixture thereof separates easily from each other in the hopper; and therefore, it is difficult to obtain a thermoplastic elastomer composition, which has a uniform composition ratio between the olefin copolymer rubber and the olefin polymer resin. Each of the references referred to above is incorporated herein by reference in its entirety.

While a thermoplastic elastomer composition is now spreading widely its uses as car interior parts such as an instrument panel (dashboard), which requires an excellent anti-fogging property, such a thermoplastic elastomer composition having an excellent anti-fogging property can hardly be obtained by the above-mentioned process, because a processing time required for a process for producing said composition is so long that the rubber and the resin are deteriorated during said processing to generate volatile low molecular weight compounds. Taking a car by way of example, various kinds of such volatile low molecular weight compounds contained in said composition evaporate, and then condense on a car windowpane to make the pane cloud, thereby causing an inconvenience of hindering the driver's visibility. The above-mentioned term "anti-fogging property" means the property free from said inconvenience.

SUMMARY OF THE INVENTION

Accordingly, it is an object of the present invention to provide a process for producing a thermoplastic elastomer composition with high efficiency, which has a uniform composition ratio.

It is another object of the present invention to provide a thermoplastic elastomer composition, which has an excellent anti-fogging property.

The present invention provides a process for producing a thermoplastic elastomer composition, which comprises the step of feeding rubber and a thermoplastic resin through feed throats independent of one another, respectively, to an extruder to perform melt kneading thereof, wherein the feed throats are connected to the extruder.

The present invention also provides a thermoplastic elastomer composition having a haze value of a glass plate of not higher than about 2%, provided that the haze value is measured with use of an apparatus according to regulations prescribed in ISO 6452 after a lapse of heating time of 20 hours at a heating temperature of 100° C.

The present invention further provides a car interior part, (i) comprising the above-mentioned thermoplastic elastomer composition, and (ii) comprising the thermoplastic elastomer composition produced by the above-mentioned process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

In FIGS. 1 and 2, each of reference symbols, $L_1$, $L_2$ and $L_3$ denotes a length of one side of a nearly cuboid-form rubber; $L_4$ denotes a distance between axes of both screws; and $L_5$ denotes a lead of a screw. Reference numerals denote as follows:

11, 22 and 40—rubber in a nearly cuboid-form wherein the term "a nearly cuboid-form" means a rectangular parallelpiped form.

12, 13, 23, 24, 42 and 43—extruder, 14, 15, 25, 26, 27, 41, 44 and 45—feed throat, 16 and 17—axis of a screw, 18 and 19—flight of a screw, 20 and 21—barrel, 28 and 46—vent, 29 and 47—dispersing zone, 30, 48, 49 and 50—dynamic cross-linking zone, 31—oil bath, 32—oil, 33—glass plate, 34—cooling plate provided with a temperature controller, 35—beaker, 36—silicone rubber-made ring-shaped packing, 37—sample, and 38 and 39—metal ring.

DETAILED DESCRIPTION OF THE INVENTION

A process for producing a thermoplastic elastomer composition in accordance with the present invention is not particularly limited in rubber used, and can be applied preferably for tacky rubber. Herein, the term "tacky rubber" means those having property such that when rubber is formed into pellets, said pellets aggregate with one another to form aggregated lumps, which cannot be broken easily into original pellets.

The tacky rubber contains, for example, an olefin copolymer rubber, a styrene rubber such as an emulsion polymerized styrene-butadiene rubber and a solution polymerized styrene-butadiene rubber, a polyisobutylene rubber, a butadiene rubber, a natural rubber, an isoprene rubber, an alfine rubber, an acrylonitrile-butadiene rubber, a fluororubber, a vinylpyridine rubber, a silicone rubber, a butadiene-methyl methacrylate rubber, an acrylic rubber, an ethylene-acrylic rubber, a polyurethane rubber, an epichlorohydrin rubber, a butyl rubber, a chlorobutyl rubber and a bromobutyl rubber.

Of these, the olefin copolymer rubber is particularly preferred for the process in accordance with the present invention.

The aforementioned term "olefin copolymer rubber" means an amorphous and random elastic copolymer, wherein a content of a repeating unit derived from an olefin in the rubber is not less than 50% by mole. As the olefin copolymer rubber, there can be exemplified a copolymer obtained by copolymerizing a combination of two or more monomers selected from the group consisting of α-olefins having 3 to 20 carbon atoms and ethylene.

Examples of the α-olefins having 3 to 20 carbon atoms are straight chain α-olefins having, for example, propylene, 1-butene, 1-pentene, 1-hexene, 1heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nanodecene and 1-eicocene; and branched α-olefins containing, for example, 3-methyl-1-butene, 3-methyl-1-pentene, 4-methyl-1-pentene, 2-ethyl-1-hexene and 2,2,4-trimethyl-1-pentene.

Examples of the combination of two or more monomers selected from the group consisting of the α-olefins having 3 to 20 carbon atoms and ethylene are ethylene/propylene, ethylene/1-butene, ethylene/1-hexene, ethylene/1octene, propylene/1-butene, propylene/1-hexene, propylene/1-octene, ethylene/propylene/1-butene, ethylene/propylene/1-hexene, ethylene/propylene/1-octene, propylene/1butene/1-hexene, propylene/1-butene/1-octene, propylene/1butene/1hexene/1-octene, ethylene/propylene/1-butene/1-hexene, ethylene/propylene/1-butene/1-octene and ethylene/propylene/1-butene/1-hexene/1-octene.

The olefin copolymer rubber may contain a copolymer of two or more monomers selected from the group consisting of the α-olefins having 3 to 20 carbon atoms and ethylene with a non-conjugated polyene. Examples of the non-conjugated polyene contain aliphatic non-conjugated polyenes, alicyclic non-conjugated polyenes and aromatic non-conjugated polyenes. The aliphatic non-conjugated polyenes contain straight chain aliphatic non-conjugated polyenes and branched aliphatic non-conjugated polyenes. These non-conjugated polyenes may have a halogen atom or alkoxy, aryl, aryloxy, aralkyl, aralkoxy or other groups in place of the hydrogen atom in their molecules.

Specific examples of the aliphatic non-conjugated polyenes contain 1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 4-ethyl-1,6-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5nonadiene, 5-ethyl-1,5-nonadiene, 6-ethyl-1,5-nonadiene, 6-methyl-1,6-nonadiene, 7methyl-1,6-nonadiene, 6-ethyl-1,6-nonadiene, 7-ethyl-1,6nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1, 5-decadiene, 6-methyl-1,5-decadiene, 5-ethyl-1,5-decadiene, 6-ethyl-1,5-decadiene, 6-methyl-1,6-decadiene, 6-ethyl-1,6- decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl1,7-decadiene, 8methyl-1,8-decadiene, 9-methyl-1,8-decadiene, 8-ethyl-1, 8-decadiene, 6methyl-1,6-undecadiene, 9-methyl-1,8-undecadiene, 6,10-dimethyl-1,5,9-undecatriene, 5,9-dimethyl-1,4,8- decatriene, 4-ethylidene-8-methyl-1,7-nonadiene, 13-ethyl-9-methyl-1,9,12-pentadecatriene, 5,9, 13-trimethyl-1,4,8,12-tetradecadiene, 8,14,16-trimethyl-1,7, 14,-hexadecatriene, and 4-ethylidene-12-methyl-1,11-pentadecadiene.

Specific examples of the alicyclic non-conjugated polyenes contain vinylcyclohexene, 5-vinyl-2-norbornene, 5-ethylidene-2-norbornene, 5-methylene-2- norbornene, 5-isopropenyl-2-norbornene, cyclohexadiene, dicyclopentadiene, cyclooctadiene, 2,5-norbornadiene, 2-methyl-2,5-norbornadiene, 2-ethyl-2,5-norbornadiene, 2,3-diisoproylidene-5-norbornene, 2-ethylidene-3-isopropylidene-5-norbornene, 6-chloromethyl-5-isopropenyl-2-norbornene, 1,4-divinylcyclohexane, 1,3-divinylcyclohexane, 1,3-divinylcyclopentane, 1,5-divinylcyclooctane, 1-allyl-4-vinylcyclohexane, 1,4-diallycyclohexane, 1-allyl-5-vinylcyclooctane, 1,5-diallylcyclooctane, 1-allyl-4-isopropenylcyclohexane, 1-isopropenyl-4-vinylcyclohexane, 1-isopropenyl-3-vinylcyclopentane and methyltetrahydroindene.

Specific examples of the aromatic non-conjugated polyenes contain divinylbenzne and vinylisopropenylbenzene.

Preferred examples of the aforementioned olefin copolymer rubber contain ethylene-propylene copolymer rubber, ethylene-propylene-non-conjugated diene copolymer rubber, ethylene-1-butene-non-conjugated diene copolymer rubber and propylene-1-butene copolymer rubber.

In the present invention, the olefin copolymer rubber is preferable for producing the cross-linked thermoplastic elastomer composition. Among them, ethylene-propylene-non-conjugated diene copolymer rubber and ethylene-propylene copolymer rubber are preferred. As the non-conjugated diene used herein, dicyclopentadiene, 1,4-hexadiene, cyclooctadiene, 5-methylene-2-norbornene and 5-ethylidene-2-norbornene are enumerated as preferred ones. Of these, 5-ethylidene-2-norbornene is more preferred. As the olefin copolymer rubber, particularly preferred is ethylene-propylene-5-ethylidene-2-norbornene copolymer rubber having a content of a unit derived from propylene of preferably from about 10 to 55% by weight, and more preferably from about 20 to 40% by weight, and a content of a unit derived from 5-ethylidene-2-norbornene of preferably from about 1 to 30% by weight, and more preferably from about 3 to 20% by weight. Here, "100% by weight" means the sum of respective contents of units derived from ethylene, propylene and 5-ethylidene-2-norbornene in the copolymer.

A process for producing the aforementioned olefin copolymer rubber is not particularly limited, and said rubber can be produced by any process known in the art. A catalyst used for said process is not also limited, and examples thereof are a multiple site catalyst such as a conventional solid catalyst, and a single site catalyst containing, for example, those obtained by using a metallocene complex. As the olefin copolymer rubber, commercially available rubber can also be used.

The olefin copolymer rubber has a Mooney viscosity at 100° C. ($ML_{1-4}$ 100° C.) of preferably from about 30 to 350, more preferably from about 120 to 350, and most preferably from about 140 to 300.

If desired, the rubber and the thermoplastic resin used in the present invention can be used in combination with a mineral oil softening agent. How to use the mineral oil softening agent can be selected from the following processes:

(i) a process wherein the mineral oil softening agent is fed through an optional feed throat of an extruder; and (ii) a process wherein the mineral oil softening agent and the olefin copolymer rubber are blended with each other to obtain an oil extended olefin copolymer rubber, which is then used. When the olefin copolymer rubber has a Mooney viscosity at 100° C. ($ML_{1+4}$ 100° C.) of from about 30 to 80, the above process (i) is preferred, and when said viscosity is from about 80 to 350, the above process (ii) is preferred. When said viscosity is from about 80 to 170, a combination of above processes (i) and (ii) can be carried out preferably.

In the case where an oil extended olefin copolymer rubber is used in accordance with the present invention, the oil extended olefin copolymer rubber contains the mineral oil softening agent in an amount of usually from about 20 to 150 parts by weight, and preferably from about 30 to 120 parts by weight, based on 100 parts by weight of the olefin copolymer rubber.

The above-mentioned term "mineral oil softening agent" means a high boiling point petroleum fraction used in order to improve processability and mechanical properties of the obtained thermoplastic elastomer composition. Examples of the mineral oil softening agent are paraffinic fractions, naphthenic fractions and aromatic fractions. Of these, paraffinic fractions are preferred. It is not preferable to use a mineral oil softening agent which has a high content of aromatic components, because the thermoplastic elastomer composition obtained by using such a mineral oil softening agent may be increased in its staining, so that it is difficult to apply such thermoplastic elastomer composition for a transparent or light color product, or said thermoplastic elastomer composition may be deteriorated in its light resistance.

A process for producing an oil extended olefin copolymer rubber, in other words, a process for blending a mineral oil softening agent with rubber, is not particularly limited, and may be any process known in the art. There are exemplified:

(i) a process wherein an olefin copolymer rubber and a mineral oil softening agent are mechanically kneaded with a kneading apparatus such as an open roll and a Banbury mixer; and (ii) a process wherein a mineral oil softening agent is added to a solution comprising a olefin copolymer rubber and a solvent, followed by desolventing according to a method such as a steam stripping method. It is recommendable to obtain an oil extended olefin copolymer rubber according to the above process (ii). As the olefin copolymer rubber-comprising solution, it is economical to use an olefin copolymer rubber solution obtained during a production process of the olefin copolymer rubber.

A thermoplastic resin used in the present invention contains those capable of giving a thermoplastic elastomer composition by melt kneading in combination with rubber. Of these, an olefin polymer resin is preferred. The term "olefin polymer resin" means a resin obtained by polymerizing an olefin, and contains, for example, an ethylene homopolymer; an α-olefin homopolymer such as a propylene homopolymer; an ethylene-α-olefin copolymer such as an ethylene-1-butene copolymer; a propylene- α-olefin copolymer such as a propylene-ethylene copolymer, a propylene-1-butene copolymer and a propylene-ethylene-1-butene copolymer; and an ethylenic copolymer such as an ethylene-vinyl acetate copolymer and an ethylene-methyl methacrylate copolymer.

Among these olefin polymer resins, preferred is a propylene based resin having an isotactic crystallinity such as a propylene homopolymer and/or a propylene-α-olefin copolymer. The α-olefin contains, for example, ethylene, 1-butene, 1-pentene, 3-methyl-1-butene, 1-hexene, 1-decene, 3-methyl -1-pentene, 4-methyl-1- pentene and 1-octene. With respect to the propylene-α-olefin copolymer, there are generally known a random copolymer and a block copolymer, both of which can be used as the olefin polymer resin in the present invention.

The propylene based resin has a melt flow rate of preferably from about 0.1 to 100 g/10 min., and more preferably from about 0.5 to 50 g/10 min., measured at a temperature of 230° C., under a load of 21.18 N according to JIS K6758.

A process for producing the above olefin polymer resin is not particularly limited, and said resin can be produced by any process known in the art. A catalyst used for the production process is not also limited, and examples thereof are a multiple site catalyst such as a conventional solid catalyst, and a single site catalyst containing, for example, those obtained by using a metallocene complex. As the olefin polymer resin, commercially available resins can also be used.

In the present invention, one kind or, if desired, two or more kinds of thermoplastic resins can be used.

A proportion between the rubber and the thermoplastic resin used in accordance with the present invention, that is, a weight ratio of rubber/thermoplastic resin, is referably from about 20 to 95/80 to 5, more preferably from about 35 to 90/65 to 10, and most preferably from about 60 to 90/40 to 10 for production of the cross-linked thermoplastic elastomer composition. For production of the non-cross-linked thermoplastic elastomer composition, it is preferably from about 15 to 80/85 to 20, and more preferably from about 15 to 50/85 to 50. When the above-mentioned oil extended olefin copolymer rubber is used, said proportion of the rubber means that of the oil extended olefin copolymer rubber.

A process for producing a thermoplastic elastomer composition in accordance with the present invention comprises the step of feeding the above-mentioned rubber and the above-mentioned thermoplastic resin through feed throats independent of one another, respectively, to an extruder to perform melt kneading thereof, thereby obtaining a desired thermoplastic elastomer composition. According to the process of the present invention, rubber in any of a particle-form or a block-form can be used without particular limitations as far as it can be fed through the feed throat connected to the extruder. However, in the process of the present invention, it is preferable to use block-form rubber, because (i) rubber is usually forwarded in a bale-like-form, that is, a block-form, and therefore in order to use particle-form rubber, a step of producing such particle-form rubber is required, which is a troublesome process, and (ii) particle-form tacky rubber easily aggregates with one another in a hopper to produce a large-sized lump, and thereby it is difficult to feed such rubber quantitatively to an extruder.

As the above-mentioned block-form rubber, those having a volume of not less than about 27 cm³ are preferred. As such rubber having a volume of not less than about 27 cm³, for example, those having a volume of not less than that of a cube can be enumerated, which cube has a side length of about 3 cm. As the rubber having such a volume, there are exemplified those in a bale-like form, which is a usual form when rubber is forwarded from a factory, and those obtained by cutting the bale-like form rubber into a nearly cuboid-form rubber. A shape of the block-form rubber is not limited to a cube or a cuboid, and may be an indefinite form. An available block-form rubber usually has a volume of at most about 100,000 cm³ or less, and even if high tacky rubber is cut into small pieces, they may easily aggregate with one another, and moreover it is difficult to handle those of a small volume. For these reasons, a volume of the block-form rubber is preferably from about 100 to 100,000 cm³, more preferably from about 1000 to 70,000 cm³, and most preferably from about 2000 to 50,000 cm³. Additionally, such block-form rubber may be used in combination with particle-form rubber if they do not aggregate with one another in a hopper to produce a large-sized lump, or the production process and the handling thereof are not troublesome.

Incidentally, with respect to rubber such as a small-sized block rubber and an indefinite-form block rubber, the volume of which is difficult to be determined, the volume determination can be carried out, for example, by sinking such rubber in a liquid such as water which is filled in a vessel, and then determining the volume of the liquid which has flowed over the vessel.

According to the process of the present invention, in order to control a feeding amount of the rubber, the rubber and the thermoplastic resin are independently of each other fed to the extruder. In the present invention, it is preferable to carry out the process in a manner such that the block-form rubber fed to the extruder is first pulverized and/or softened in the extruder, and thereafter the resulting rubber and the thermoplastic resin are subjected to melt kneading. It is more preferable to carry out the process in a manner such that the rubber is softened and thereafter the resulting rubber and the thermoplastic resin are subjected to melt kneading.

In carrying out the pulverizing and/or softening of the block-form rubber, followed by melt kneading the resulting rubber and the thermoplastic resin, the block-form rubber is pulverized and/or softened with the extruder, and thereafter the resulting rubber is usually subjected to melt kneading with the thermoplastic resin without taking out of the system. The term, "without taking out of the system", means that the resulting rubber is not taken out from a series of apparatuses for storage from the feeding of the block-form rubber to the extruder to the joining with the thermoplastic resin.

In the process of the present invention, the extruder is not particularly limited in number. The process may be carried out with one extruder or two or more extruders. For example, there are enumerated;

(1) a process wherein one extruder, the block-form rubber is fed at the upper stream side of the extruder to perform the pulverizing and/or softening, and the thermoplastic resin is fed at the downstream side thereof to join both and perform the melt-kneading, (2) a process wherein using two extruders, the block-form rubber is fed at the upper stream side of the first extruder to perform the pulverizing and/or softening, the first extruder is connected to the upper stream side of the second extruder, and the thermoplastic resin is fed at the downstream side of the connected zone to join both and perform the melt kneading, and (3) a process wherein using three extruders, the block-form rubber is fed to the first extruder to perform the pulverizing and/or softening, the thermoplastic resin is fed to the second extruder, and both the resulting rubber and the thermoplastic resin are fed from the first and second extruders, respectively, to the third extruder to join both and perform the melt kneading. Of these, the process using two extruders such as the above-mentioned process (2) is preferred.

Figure 1:
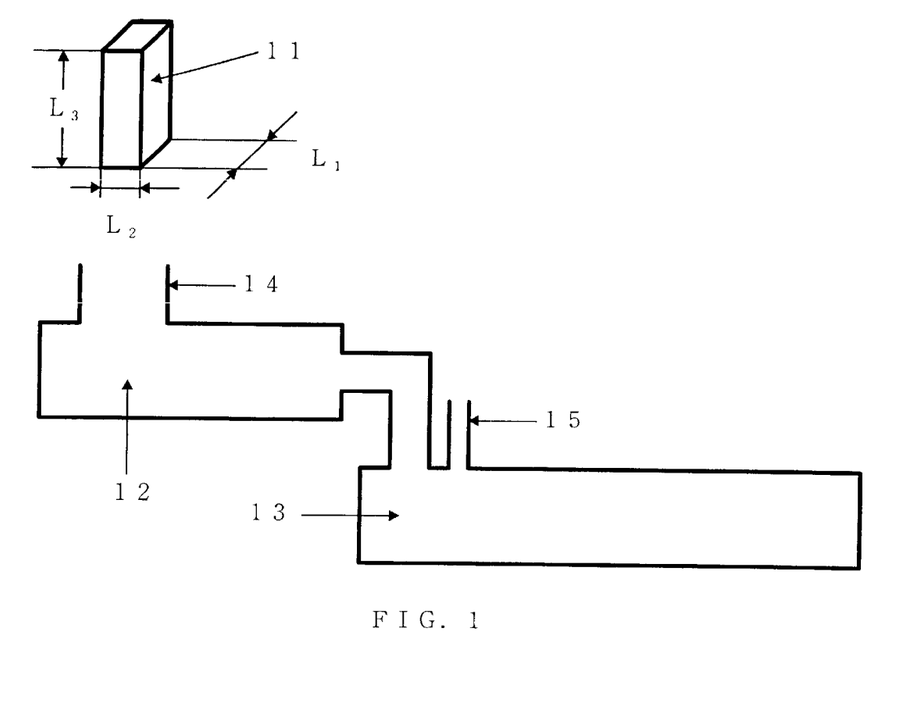
FIG. 1 shows an example of embodiments in accordance with the present invention, and shows an exemplary process for producing a thermoplastic elastomer composition with use of two extruders.

FIG. 1 shows one embodiment of the above process (2). In FIG. 1, reference numeral 11 denotes a block-form rubber in a nearly cuboid-form; and reference numerals 12, 13, 14 and 15 denote a first extruder, a second extruder, a feed throat of the first extruder and a feed throat of the second extruder, respectively. In FIG. 1, the first extruder and the second extruder are connected in series. The block-form rubber 11 is fed from the feed throat 14 to the first extruder 12 to perform the pulverizing and/or softening, and the resulting rubber is fed to the second extruder 13 without taking out of the system. Successively, the thermoplastic resin is fed through the feed throat 15 to the extruder 13 to perform the melt kneading of the rubber and the thermoplastic resin, thereby obtaining a desired non-cross-linked thermoplastic elastomer composition, or a desired cross-linked thermoplastic elastomer composition, provided that a dynamic cross-linking is effected at the time of the melt kneading of the rubber and the thermoplastic resin.

In FIG. 1, in order to quantitatively convey the rubber from the first extruder 12 to the second extruder 13, any apparatus such as a known gear pump and a known static mixer may be provided to a tip portion at the downstream side of the first extruder 12.

When the block-form rubber is used, it is preferable to use an extruder, in which a screw arranged at a rubber-feeding portion is a twin screw gyrating in a different direction, and to insert the block-form rubber between both screws gyrating in a different direction. Here, the term, "screw arranged at a rubber-feeding portion" means, for example, the screw arranged under the feed throat 14 in FIG. 1.

Figure 2:
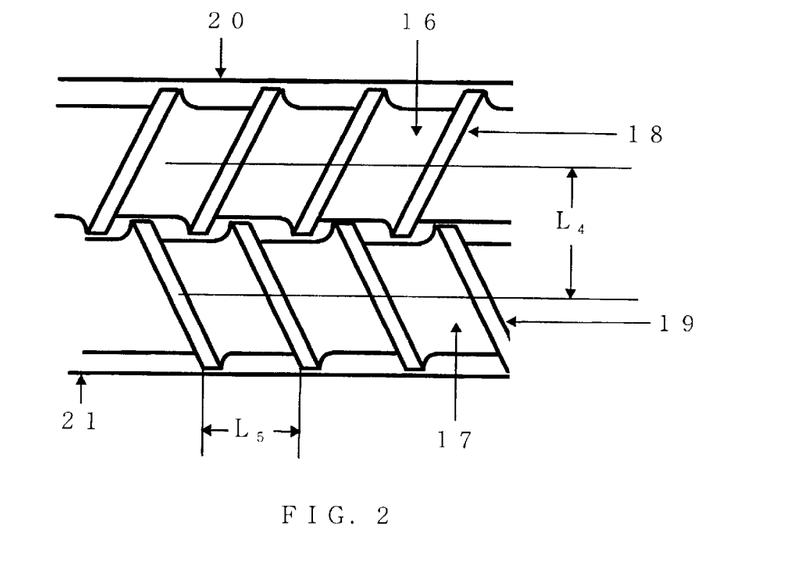
FIG. 2 shows one embodiment of screws and a barrel arranged under a feed throat 14 in the extruder 12 shown in FIG. 1.

FIG. 2 shows one embodiment of screws and barrels arranged under the feed throat 14 in FIG. 1. In FIG. 2, reference numerals 16 and 17 denote an axis of the screw, respectively; reference numerals 18 and 19 denote a flight of the screw respectively; and reference numerals 20 and 21 denote a barrel, respectively. Two screws, namely, one screw having the axis 16 and the flight 18 and the other screw having the axis 17 and the flight 19, rotate in a direction different from each other. The block-form rubber 11 is inserted between said both screws to be drawn therein by rotation of both screws, so that the block-form rubber 11 can be steadily fed to the extruder 12.

Examples of the extruder are a different-direction rotating twin screw extruder and a twin screw single screw extruder. Said term "twin screw single screw extruder" means an extruder, which has a different-direction rotating twin screw at its upper stream side and a single screw at its downstream side.

With respect to arrangement of said both screws in the different-direction rotating twin screw extruder and the twin screw single screw extruder, both screws may be arranged so as to run in parallel with each other. Alternatively, the screws may be arranged obliquely like in an inclination type twin screw extruder. In order to feed steadily the block-form rubber to an extruder, it is preferable to arrange both screws in parallel.

In order to insert smoothly the block-form rubber between both screws, an additional equipment such as a pusher may be used as an auxiliary means. The block-form rubber can be fed further steadily to the extruder by inserting said rubber between both screws with the aid of the pusher.

When a nearly cuboid-form rubber such as a bale rubber is used as the block-form rubber, it is preferable that a length of at least one side in three sides of the nearly cuboid-form rubber is shorter than a distance between axes of both screws in order to inserting steadily the block-form rubber between both screws.

In FIG. 1, reference symbols, $L_1$, and $L_2$ and $L_3$ denote each length of three sides of the nearly cuboid-form rubber 11. And the above term "distance between axes of both screws" means a distance between centers of axes in both screws, and corresponds to reference symbol $L_4$ shown in FIG. 2. The above definition, "length of at least one side in three sides of the nearly cuboid-form rubber is shorter than a distance between axes of both screws", means that any of $L_1$, $L_2$ and $L_3$ is shorter than $L_4$. In other words, it means that any one of $L_1<L_4$, $L_3<L_4$ and $L_3<L_4$ is satisfied.

When it is difficult to uncodtionally determine the distance between axes of both screws, for example, when the aforementioned inclination type twin screw extruder is used, in which both screws are arranged obliquely, the distance between axes of both screws can be replaced by a maximum distance between axes of both screws arranged at the block-form rubber feeding portion. Therefore, in this case, it is preferred that the length of at least one side in three sides of the nearly cuboid-form rubber is shorter than said maximum distance.

Further, when the nearly cuboid-form rubber is used as the block-form rubber, it is preferred that the length of at least one side in three sides of the nearly cuboid-form rubber is shorter than a lead of the screw in order to insert steadily the block-form rubber between the screws.

In FIG. 2, reference symbol $L_5$ denotes a lead of the screw. The above definition, "length of at least one side in three sides of the nearly cuboid-form rubber is shorter than a lead of the screw" means that any one of $L_1$, $L_2$ and $L_3$ is shorter than $L_5$. In other words, it means that any one of $L_1<L_5$, $L_2<L_5$ and $L_3<L_5$ is satisfied.

Furthermore, when the nearly cuboid-form rubber is used as the block form rubber, it is more preferable that the length of at least one side in three sides of the nearly cuboid-form rubber is shorter than the distance between axes of both screws, and also the length of at least the other one side of the nearly cuboid-form rubber is shorter than a lead of the screw.

For example, when $L_1$, $L_2$ and $L_3$ in FIG. 1 have relation of $L_1<L_2<L_3$, both conditions of $L_1<L_4$ and $L_5$, or both conditions of $L_1<L_5$ and $L_2<L_4$ are satisfied.

In the process in accordance with the present invention, the thermoplastic resin can be fed to the extruder through the feed throat using a known feeding apparatus such as a belt-feeder type apparatus and a screw-feeder type apparatus. With respect to the feed throat for the thermoplastic resin, a single throat or two or more throats may be adopted.

According to the process in accordance with the present invention, dynamic cross-linking can be performed at the time of melt kneading of the rubber and the thermoplastic resin.

Figure 3:
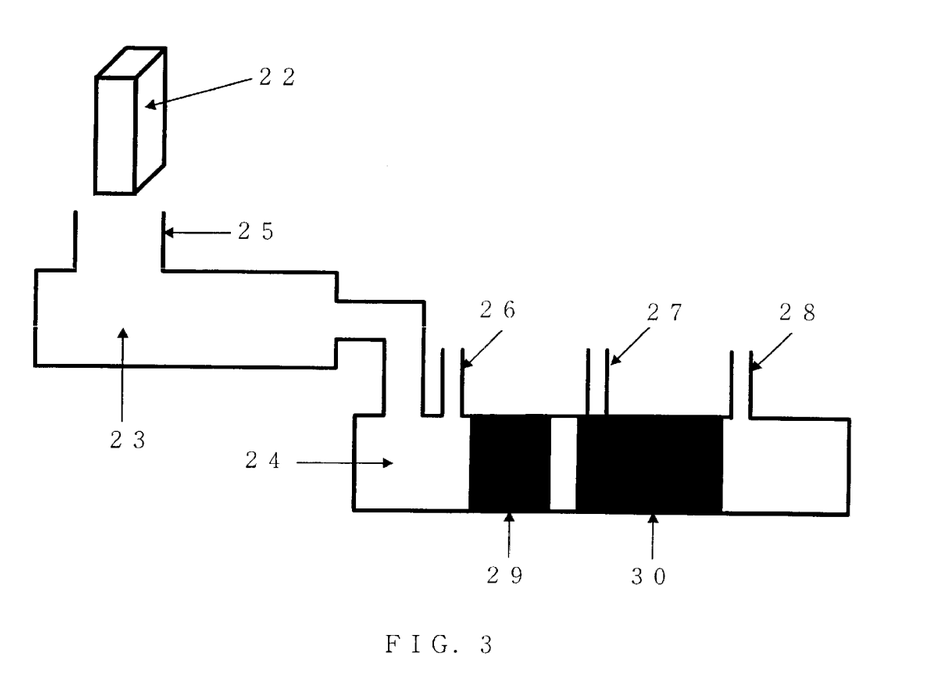
FIG. 3 shows an example of embodiments in accordance with the present invention, and shows a preferred process for producing a cross-linked thermoplastic elastomer composition by melt kneading and dynamic cross-linking an olefin copolymer rubber and an olefin polymer resin.

FIG. 3 shows a preferred embodiment of the process, wherein the olefin copolymer rubber and the olefin polymer resin are subjected to kneading and dynamic cross-linking to obtain a desired cross-linked thermoplastic elastomer composition. In FIG. 3, reference numerals 22 denotes an olefin copolymer rubber in a nearly cuboid-form; reference numeral 23 denotes a first extruder; reference numeral 24 denotes a second extruder; reference numerals 25, 26 and 27 denote a feed throat, respectively; reference numerals 28 denotes a vent for discharging a volatile gas out of the extruder 24; reference numerals 29 denotes a dispersing zone, wherein the olefin copolymer rubber and the olefin polymer resin are melt kneaded; and reference numeral 30 denotes a dynamic cross-linking zone.

The nearly cuboid-form olefin copolymer rubber 22 is fed through the feed throat 25 to the extruder 23 to perform pulverizing and/or softening in the extruder 23, and then the pulverized and/or softened olefin copolymer rubber is fed to the extruder 24. One the other hand, the olefin polymer resin is fed to the extruder 24 through the feed throat 26 using a known supplying apparatus such as belt-feeder type apparatus and screw-feeder type apparatus. The olefin copolymer rubber and the olefin polymer resin are melt kneaded in the dispersing zone 29, and then a cross-linking agent is fed through the feeding throat 27 to perform the dynamic cross-linking in the dynamic cross-linking zone 30.

As the extruder 24, there can be used a single screw extruder, a twin screw extruder and a multi screw extruder containing a triple screw extruder, which are provided with a screw or rotor having a design to improve the kneadability. With respect to the design to improve the kneadability, there are enumerated, for example, dulmage, pin and multiple flight screws as the single screw extruder, and kneading disk and rotor as the twin screw extruder. As this type of commercially available extruders, there are enumerated, for example, BUSS KO-KNEADER (Buss Co.) as the single screw extruder, and ZSK Type extruder (W & P Co.), TEX Type extruder (The Japan Steel Works, Ltd.), TEM Type extruder (Toshiba Machine Co., Ltd.), KTX Type extruder (Kobe Steel, Ltd.) and MIXTRON LCM Type extruder (Kobe Steel, Ltd.) as the twin screw extruder. In the present invention, the twin screw extruder is more preferable than the single screw extruder from a viewpoint of productivity. Among the twin screw extruders, a same-direction rotating type is more preferable than a different-direction rotating one, because no gnawing occurs even when operated for a long period of time.

A preferred embodiment of the process for producing a desired thermoplastic elastomer composition is as follows. A bale-like olefin copolymer rubber or a cut product thereof is fed to a first extruder, wherein the screw arranged at the feed portion is a twin screw rotating in a different direction, and the distance between axes of both screws is longer than the length of at least one side in three sides of the bale-like olefin copolymer rubber or the cut product thereof, thereby the olefin copolymer rubber is softened with the first extruder, and the resulting olefin copolymer rubber is fed from the first extruder to the other extruder, wherein the olefin copolymer rubber and the olefin polymer resin are subjected to dynamic cross-linking to obtain a desired thermoplastic elastomer composition. More preferred is a process of using a first extruder, wherein a screw lead is longer than the length of at least one side in two sides, which are the rest obtained by removing one side, the length of which side is shorter than the distance between axes of both screws in the first extruder, out of three sides of the bale-like olefin copolymer rubber or the cut product thereof.

The cross-linking agent used for the dynamic cross-linking is not particularly limited. Preferable cross-linking agents are those which are capable of performing cross-linking of the rubber. For example, an organic peroxide, sulfur and a phenol resin can be used as the cross-linking agent. Of these, an organic peroxide is preferred.

Although the feed throat for the cross-linking agent is not particularly limited, as is shown in FIG. 3, it is preferable to carry out the melt kneading of the olefin copolymer rubber and the olefin polymer resin in the dispersing zone 29 of the extruder 24, and thereafter to feed the cross-linking agent through the feed throat 27 to perform the dynamic cross-linking of olefin copolymer rubber and the olefin polymer resin in the dynamic cross-linking zone 30. This is particularly preferable when an organic peroxide is used as the cross-linking agent.

When a cross-linking agent having a low cross-linking activity is used, it is also possible to carry out the melt kneading of the olefin copolymer rubber, the olefin polymer resin and such a cross linking agent in the dispersing zone 29 of the extruder 24, and thereafter to add a cross-linking promoter into the dynamic cross-linking zone 30 to perform the dynamic cross-linking. This is particularly preferable when a methylphenol based resin as the cross-linking agent, and stannous chloride as the cross-linking promoter are used.

Although the cross-linking agent used in the present invention may be in a liquid or powder form, a liquid cross-linking agent is preferred. From a viewpoint of obtaining an excellent thermoplastic elastomer composition, it is very important to improve dispersibility of the cross-linking agent. Thus, it is preferable to use the cross-linking agent in combination with a diluent containing, for example, an inorganic filler, a mineral oil and a solvent, which are inert to the cross-linking reaction. A paraffinic oil is a preferable diluent because of easy handling thereof and no substantial effect thereof on the thermoplastic elastomer composition obtained. The liquid and powder cross-linking agents can be fed to the extruder using a quantitative pump and a quantitative feeder, respectively.

As the cross-linking agent of an organic peroxide, 2,5-dimethyl-2,5-di(t-butylperoxy)hexane, 2,5-dimethyl-2,5-di(t-butylperoxyl)hexyne-3,1,3-bis-(t-butylperoxyisopropyl)benzene, 1,1-di(t-butylperoxy-3,5,5-trimethylcyclohexane, 2,5-dimethyl-2,5-di(peroxybenzoyl)hexyne-3 and dicumenyl peroxide can be exemplified. Of these, 2,5-dimethyl-2,5-di(t-butylperoxy)hexane is particularly preferred from a viewpoint of its odor and scorching property.

An amount of the cross-linking agent added can usually be determined within a range of from about 0.005 to 5 parts by weight, and preferably from about 0.01 to 4 parts by weight based on 100 parts by weight of the sum of the rubber and the thermoplastic resin. When it is less than about 0.005 parts by weight, the effect of the cross-linking reaction may be insufficient. When it exceeds 5 parts by weight, it may be difficult to control the cross-linking reaction, and it is not advantageous from an economical point of view.

The organic peroxide may be used in combination with a cross-linking co-agent. It is preferable to feed the cross-linking co-agent to (i) a throat at the upper stream than a throat, to which the cross-linking agent is fed, or (ii) to the same throat as that of feeding the cross-linking agent. Examples of the cross-linking co-agent are N,N'-m-phenylenebismaleimide, toluylenebismaleimide, p-quinonedioxime, nitrobenzene, diphenylguanidine, trimethylolpropane, divinylbenzene, ethyleneglycol dimethacrylate, polyethyleneglycol dimethacrylate, trimethylolpropane trimethacrylate and allyl methacrylate. By using the cross-linking agent in combination with the cross-linking co-agent, a homogeneous and mild cross-linking reaction can be attained to improve mechanical properties of the thermoplastic elastomer composition obtained.

An amount of the cross-linking co-agent added is usually from about 0.01 to 4 parts by weight, and preferably from about 0.05 to 2 parts by weight based on 100 parts by weight of the sum of the rubber and the thermoplastic resin. An amount less than about 0.01 part by weight hardly exhibits an effect, and that exceeding about 4 parts by weight is not advantageous from an economical point of view.

The dispersing zone 29 and the dynamic cross-linking zone 30 preferably have a screw, a rotor or others designed so as to improve a kneadability. When a twin screw extruder is used for the dispersing zone 29 and the dynamic cross-linking zone 30, it can be used in combination with a disk containing, for example, a forward kneading disk, a backward kneading disk and a perpendiculary intersecting kneading disk.

A temperature of the dispersing zone 29 is at least that of melting the thermoplastic resin. When the temperature is too high, it is difficult to control the successive dynamic cross-linking. Therefore, the temperature is preferably as low as possible, provided that said thermoplastic resin can be melted at said temperature. For example, when polypropylene is used as the thermoplastic resin, a preferred temperature is from about 140 to 250° C.

The rubber is conveyed to the extruder 24 preferably in a softened state. A temperature of the rubber conveyed to the extruding machine 24 is preferably from about 80 to 200° C., and more preferably from about 120 to 180° C. When the temperature is lower than about 80° C., it may be difficult to convey the rubber steadily to the extruder 24, because the rubber is insufficiently softened. Whereas, when the temperature exceeds about 200° C., it may be insufficient to knead the rubber and the thermoplastic resin in the extruder 24, or it may be difficult to control the successive dynamic crosslinking.

A maximum shear rate in the dynamic cross-linking zone 30 is preferably from about 500 $\sec^{-1}$ to 2000 $\sec^{-1}$ (exclusive), and more preferably from about 1000 $\sec^{-1}$ to 1900 $\sec^{-1}$. The maximum shear rate can be determined based on a minimum distance between the barrel and the screw, the inside diameter of the barrel and the rotation speed of the screw.

A temperature of the dynamic cross-linking zone 30 can be determined depending on a kind of the cross-linking agent used. When the organic peroxide is used as the cross-linking agent, it is preferably not lower than about 150° C., and more preferably from about 150 to 300° C. in order to consume the organic peroxide almost completely at an outlet of the extruder 24 (cf. right end in FIG. 3). A temperature of the kneaded product in the dynamic cross-linking zone 30 ranges preferably from about 180 to 290° C., and more preferably from about 200 to 280° C. When the temperature of the kneaded product reaches nearly 300° C., the decomposition or deterioration of the kneaded product, or overextended cross-linking reaction occur easily, thereby resulting in coloring or poor appearance of the thermoplastic elastomer obtained.

A residence time of the kneaded product in the dynamic cross-linking zone 30 can be determined depending, on for example, a size of the extruder 24, a temperature of the dynamic cross-linking zone 30 and reactants used. It is preferably not less than at least about 10 seconds, and less than 3 minutes.

An additional thermoplastic resin may be fed after completion of the dynamic cross-linking.

In the present invention, if desired, additives such as an inorganic filler, an antioxidant, a weatherproof agent, an antistatic agent, a lubricant and a coloring pigment may be added. In the production of a cross-linked thermoplastic elastomer composition, they may be fed to any throat of an extruder, provided that the cross-linking reaction is not injured.

Further in the present invention, both the cross-linked and non-cross-linked thermoplastic elastomer compositions can be obtained in a pellet form by any method known in the art such as an underwater-cutting method, a cold-cutting method and a hot-cutting method.

If desired, a tackiness inhibitor may be adhered on the surface of the pellet-form thermoplastic elastomer composition obtained. Examples of the tackiness inhibitor are inorganic powders containing, for example, talc, sodium carbonate and silica, and powders containing, for example, olefin polymer resins. Of these, powders of ethylene polymer resins are preferred.

The thermoplastic elastomer composition in accordance with the present invention has a superior anti-fogging property, and has a haze value of a glass plate of not higher than about 2%, provided that the haze value is measured with use of an apparatus according to regulations prescribed in ISO 6452 after a lapse of heating time of 20 hours at a heating temperature of 100° C.

The thermoplastic elastomer composition having not higher than about 2% of the haze value measured according to the above manner is suitable for car interior parts, particularly for an instrument panel. Such a superior anti-fogging thermoplastic elastomer composition in accordance with the present invention can be obtained preferably by melt kneading rubber and a thermoplastic resin. In this respect, the rubber preferably contains the aforementioned olefin copolymer rubber, and the thermoplastic resin preferably contains the aforementioned olefin polymer resin. Such a thermoplastic elastomer composition can be produced according to the aforementioned process for producing the thermoplastic elastomer composition in accordance with the present invention.

As mentioned above in detail, according to the present invention, there is provided an industrially advantageous process for producing a thermoplastic elastomer composition having a uniform composition ratio, according to which, even when highly tacky rubber is used, the rubber can be fed steadily to an extruder in a production process of a thermoplastic elastomer composition by melt kneading rubber and a thermoplastic resin to obtain a desired thermoplastic elastomer composition. There is further provided a simple process for producing a thermoplastic elastomer composition having a uniform composition ratio, according to which rubber can be fed further steadily to an extruder by using rubber in a block-form. According to the present invention, there is furthermore provided a thermoplastic elastomer composition having a superior or anti-fogging property, which is required in uses of car interior parts such as an instrument panel (i.e. dashboard).

EXAMPLE

The present invention is illustrated in more detail with reference to the following Example, which is only illustrative, and is not limitative for the scope of the present invention.

Anti-fogging Property

The anti-fogging property is expressed by a haze value of a glass plate, which was obtained by carrying out a fogging test using an apparatus according to ISO 6452. The haze value was measured according to JIS K7105.

Figure 4:
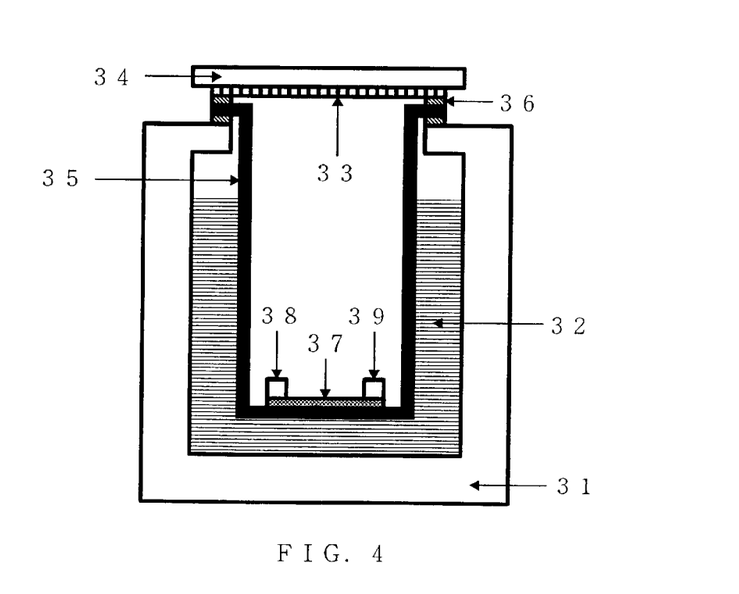
FIG. 4 shows a sectional view of an apparatus according to regulations prescribed in ISO 6452, which is used for measuring a haze value of fogging.

Here, the term "ISO" means International Organization for Standardization. As the apparatus according to ISO 6452, an apparatus shown in FIG. 4 was used. In FIG. 4, reference numeral 31 denotes an oil bath; reference numeral 32 denotes an oil; reference numeral 33 denotes a glass plate; reference numeral 34 denotes a cooling plate provided with a temperature controller; reference numeral 35 denotes a beaker having an inside diameter of 90 mm ø; and reference numeral 36 denotes a silicone rubber-made ring-shaped packing. A clearance between the inner wall of the oil bath 31 and the outer wall of the beaker 35 is 40 mm. In addition, reference numeral 37 denotes a sample, and reference numerals 38 and 39 denote a chromium-plated metal ring, respectively. A haze value of the glass plate 33 before the fogging test was found to be 0.3%. In the present invention, a haze value of the glass plate 33 before the fogging test should not be more than 0.5%.

In measuring the anti-fogging property, the oil bath 31 and the cooling plate 34 were controlled to 100±2° C., and 20±2° C., respectively, and the sample 37 was adjusted to 80 mmø×1 mm (thick). The sample 37 was heated for 20 hours in the beaker 35, then taken out and placed under conditions of 23±2° C. and 50% RH, and after 1±0.1 hour, the haze value of the glass plate 33 was measured according to JIS K7105. Said haze value obtained was used as a measure of anti-fogging property.

Figure 5:
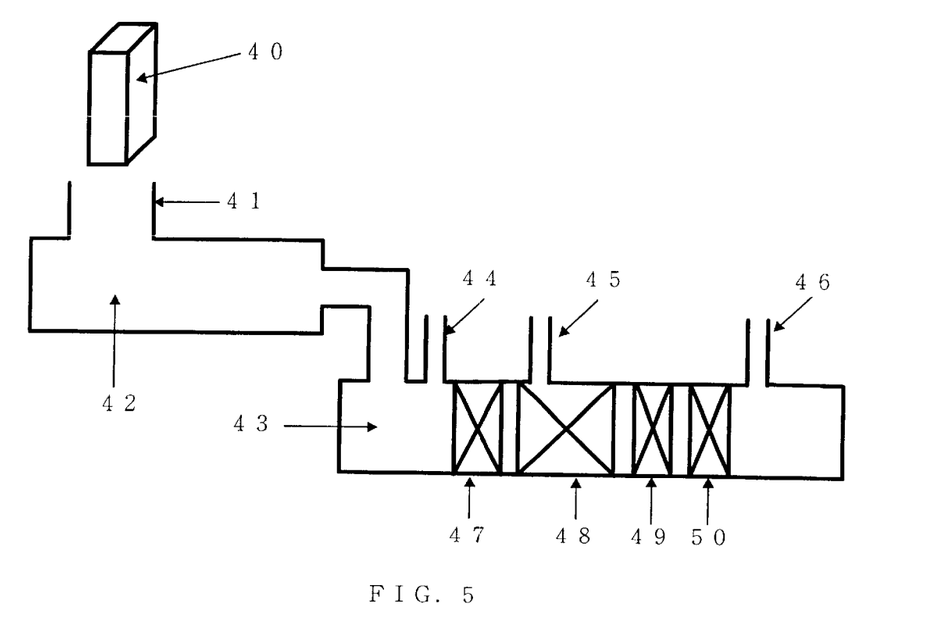
FIG. 5 shows a constitution of the apparatus used in the Example of the present invention.

FIG. 5 shows a constitution of the apparatus used in in Example. In FIG. 5, reference numeral 40 denotes oil extended ehtylene-propylene-5-ethylidene-2-norbornene copolymer rubber in a nearly cuboid-form of about 130 mm×about 150 mm×about 330 mm; reference numeral 41 denotes a feed throat; reference numerals 42 and 43 denote an extruder, respectively; reference numerals 44 and 45 denote a feed throat, respectively; reference numeral 46 denotes a vent for discharging a volatile gas out of the extruder 43; and reference numerals 47, 48, 49 and 50 denote a zone provided with kneading disks, respectively. Here, the zone 47 is for dispersing and the zones 48 to 50 are for dynamic cross-linking.

Next, the constitution of the extruders 42 and 43 and operation conditions thereof are illustrated as follows.

(1) Extruder 42: a different-direction rotating twin screw extruder of barrel diameter =230 mm, L/D=5, number of cylinder block=2, and distance between axes of both screws =207 mm. Hereinafter, each cylinder block is designated C1 and C2 in this order from the upper stream side of the extruder 42. The feed throat 41 for feeding rubber is connected to C1. A lead of both screws under the feed throat 41 was 287.5 mm. A pusher, which is not shown in FIG. 5, was provided as an auxiliary means for feeding rubber to the extruder. A rotation speed of the screws was 13.5 rpm, and a temperature set for the cylinder was C1/C2=170° C./170° C.

(2) Extruder 43: a same-direction rotating twin screw extruder of barrel diameter =120 mm, L/D=42, number of cylinder block=12. Hereinafter, each cylinder block is designated C1, C2, C3, . . . , C10, C11 and C12 in this order from the upper stream side of the extruder 43, and a die is designated D. The feed throat 44 for feeding a thermoplastic resin and various kinds of additives, and the feed throat (nozzle) 45 for feeding a cross-linking agent are connected to C2 and C6, respectively. A rotation speed of the screws was 120 rpm, and respective temperatures set for the cylinder and the die was C1/C2/C3/C4/C5/C6/C7/C8/C9/C10/C11/C12/D=160/160/160/140/140/140/160/180/200/200/160/160/240° C.

A bale-like oil extended ethylene-propylene-5-ethylidene-2-norbornene copolymer rubber having a size of about 150 mm×about 660 mm×about 330 mm, and a weight of 25 kf (manufactured by Sumitomo Chemcial Co., Ltd.; trademark ESPRENE 670F) was cut into 5 pieces with a cutter to form the nearly cuboid-block form rubber 40 of about 130 mm×about 150 mm×about 330 mm. Successively, the rubber was fed to the extruder 42 through the feed throat 41 and softened therein, and the softened rubber was fed to the extruder 43 at 530 kg/hr.

On the other hand, polypropylene (manufactured by Sumitomo Chemical Co., Ltd.; trademark NOBLENE Y501N of MFR =13 g/10 min. measured at 230° C. under a load of 21.18 N according to JIS K6758) and a mixture of additives were fed to the extruder 43 through the feed throat 44, respectively, with the aid of a quantitative feeder. The polypropylene and the mixture of additives were fed at a feeding rate of 86.4 kg/hr and 7.48 kg/hr, respective. Here, the mixture of additives had a composition of a cross-linking co-agent (manufactured by Sumitomo Chemical Co., Ltd.; trademark SUMIFINE BM)/an antioxidant (manufactured by Sumitomo Chemical Co., Ltd.; trademark SUMILIZER BP101)=0.9/0.25 by weight.

In the zone 47 provided with kneading disk were kneaded the oil extended ethylene-propylene 5-ethylidene-2-norbornene copolymer rubber, polypropylene and the mixture of additives.

Further, a 10% by weight dilute product of 2,5-dimethyl-2,5-di(t-butylperoxy)hexane in a mineral oil (a paraffinic oil manufactured by Idemitsu Kosan Co., Ltd.; trademark DIANA PROCESS OIL PW380) was fed to the extruder 43 at 20.9 kg/hr using a plunger pump.

The dynamic cross-linking was performed in the kneading disk zones 48, 49 and 50. The resulting product was formed into a pellet form using an underwater cutter to obtain an olefinic thermoplastic elastomer composition in a pellet form.

The pellets obtained was pressed under a pressure of 10 Mpa for 2 minutes with a press adjusted to 200° C. to obtain a sheet having a thickness of 1 mm. The resulting sheet was cut to obtain a sample of 80 mmø×1 mm, which was then subjected to evaluation of the anti-fogging property. A haze value of the glass plate was found to be 0.4%.

What is claimed is:

1. A process for producing a thermoplastic elastomer composition, which comprises the step of feeding a rubber that contains a block-form rubber, and a thermoplastic resin, through feed throats independent of one another, respectively, to an extruder to perform melt kneading thereof, wherein the feed throats are connected to the extruder;

wherein the block-form rubber is inserted between both screws rotating in a different direction to be fed to the extruder, and the block-form rubber is a nearly cuboid-form rubber wherein a length of at least one side in three sides of said nearly cuboid-form rubber is shorter than a distance between axes of both screws.

2. The process for producing a thermoplastic elastomer composition according to claim 1, wherein the block-form rubber has a volume of not less than about 27 cm³.

3. The process for producing a thermoplastic elastomer composition according to claim 2, wherein the block-form rubber fed to the extruder is subjected to pulverization and/or softening, and then the resulting rubber is melt kneaded with the thermoplastic resin.

4. The process for producing a thermoplastic elastomer composition according to claim 1, wherein the block-form rubber is a nearly cuboid-form rubber wherein a length of at least one side in three sides of said nearly cuboid-form rubber is shorter than a lead of the screw.

5. The process for producing a thermoplastic elastomer composition according to claim 2, wherein the block-form rubber is a nearly cuboid-form rubber wherein a length of at least one side in three sides of said nearly cuboid-form rubber is shorter than a lead of the screw.

6. The process for producing a thermoplastic elastomer composition according to claim 1, wherein the melt kneading is carried out under a dynamic cross-linking.

7. The process for producing a thermoplastic elastomer composition according to claim 1, wherein the rubber comprises an olefin copolymer rubber.

8. The process for producing a thermoplastic elastomer composition according to claim 1, wherein the thermoplastic resin comprises an olefin copolymer rubber.

9. A car interior part comprising a thermoplastic elastomer composition, which is produced by a process comprising the step of feeding a rubber that contains a block-form rubber, and a thermoplastic resin, through feed throats independent of one another, respectively, to an extruder to perform melt kneading thereof, wherein the feed throats are connected to the extruder;

wherein the block-form rubber is inserted between both screws rotating in a different direction to be fed to the extruder, and the block-form rubber is a nearly cuboid-form rubber wherein a length of at least one side in three sides of said nearly cuboid-form rubber is shorter than a distance between axes of both screws.

* * * * *